US009942156B1

(12) United States Patent
Zhou et al.

(10) Patent No.: US 9,942,156 B1
(45) Date of Patent: *Apr. 10, 2018

(54) FLOW LEVEL DYNAMIC LOAD BALANCING

(71) Applicant: Google Inc., Mountain VIew, CA (US)

(72) Inventors: Junlan Zhou, Mountain View, CA (US); Min Zhu, Mountain View, CA (US); Amin Vahdat, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,228

(22) Filed: Jun. 15, 2016

Related U.S. Application Data

(63) Continuation of application No. 14/039,611, filed on Sep. 27, 2013, now Pat. No. 9,379,981.

(51) Int. Cl.
| | |
|---|---|
| *H04L 12/26* | (2006.01) |
| *H04L 12/803* | (2013.01) |
| *H04L 12/721* | (2013.01) |
| *H04L 12/741* | (2013.01) |
| *H04L 12/733* | (2013.01) |

(52) U.S. Cl.
CPC .......... *H04L 47/125* (2013.01); *H04L 45/20* (2013.01); *H04L 45/38* (2013.01); *H04L 45/74* (2013.01)

(58) Field of Classification Search
CPC ....... H04L 47/125; H04L 45/20; H04L 45/38; H04L 45/74; H04L 12/26
See application file for complete search history.

(56) References Cited

U.S. PATENT DOCUMENTS

| | | | |
|---|---|---|---|
| 2002/0145981 A1* | 10/2002 | Klinker | H04L 12/5695 370/244 |
| 2004/0042402 A1 | 3/2004 | Galand et al. | |
| 2004/0114569 A1 | 6/2004 | Naden et al. | |
| 2007/0087756 A1* | 4/2007 | Hoffberg | G06Q 10/0631 455/450 |
| 2007/0171909 A1* | 7/2007 | Pignatelli | H04L 12/5693 370/392 |

(Continued)

OTHER PUBLICATIONS

Open Networking Foundation OpenFlow Switch Specification, Version 1.3.2 Apr. 25, 2013.

(Continued)

*Primary Examiner* — Wei Zhao
(74) *Attorney, Agent, or Firm* — McDermott Will & Emery LLP

(57) ABSTRACT

Exemplary embodiments allocate network traffic among multiple paths in a network, which may include one or more preferred paths (e.g. shortest paths) and one or more alternative paths (e.g., non-shortest paths). In one embodiment, network traffic in form of flows may be allocated to the preferred paths until the allocation of additional network traffic would exceed a predetermined data rate. Additional flows may then be sent over the alternative paths, which may be longer than the preferred path. The paths to which each flow is assigned may be dynamically updated, and in some embodiments the path assignment for a particular flow may time out after a predetermined time. Accordingly, the flow traffic of each path may be balanced based on real-time traffic information.

16 Claims, 6 Drawing Sheets

(56) References Cited

U.S. PATENT DOCUMENTS

| | | |
|---|---|---|
| 2007/0206762 A1 | 9/2007 | Chandra et al. |
| 2009/0141656 A1* | 6/2009 | Fan .................. H04L 29/12009 370/254 |
| 2014/0241366 A1 | 8/2014 | Smith |

OTHER PUBLICATIONS

U.S. Notice of Allowance on U.S. Appl. No. 14/039,611 dated Mar. 1, 2016.
U.S. Office Action in U.S. Appl. No. 14/039,611 dated Apr. 30, 2015.
U.S. Office Action in U.S. Appl. No. 14/013,832 dated Jun. 4, 2015.
U.S. Office Action on U.S. Appl. No. 14/013,832 dated Feb. 25, 2016.
U.S. Office Action on U.S. Appl. No. 14/013,832 dated Oct. 13, 2015.
U.S. Office Action on U.S. Appl. No. 14/039,611 dated Oct. 26, 2015.

* cited by examiner

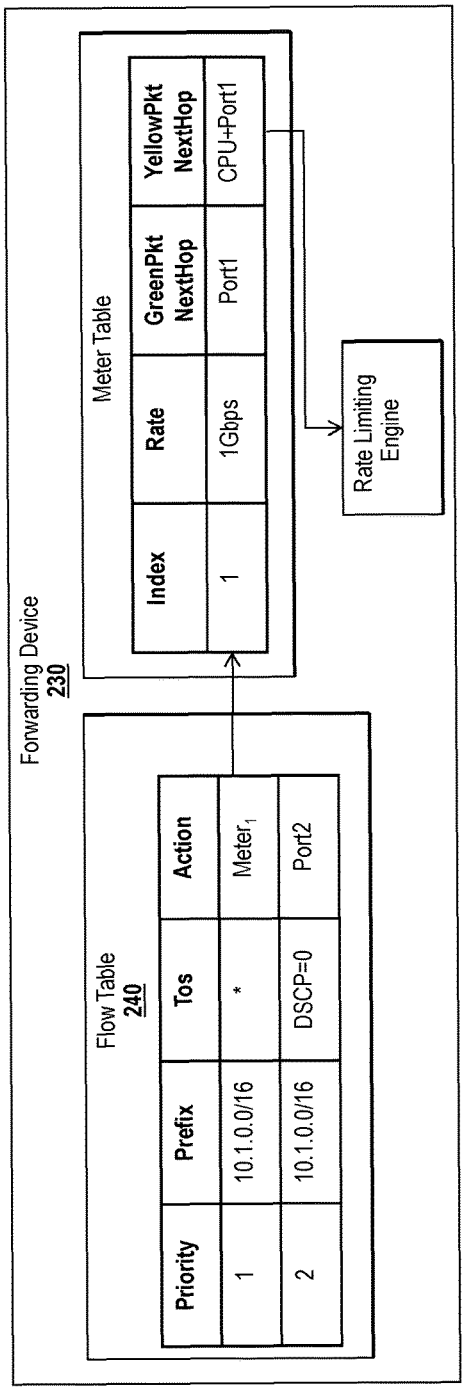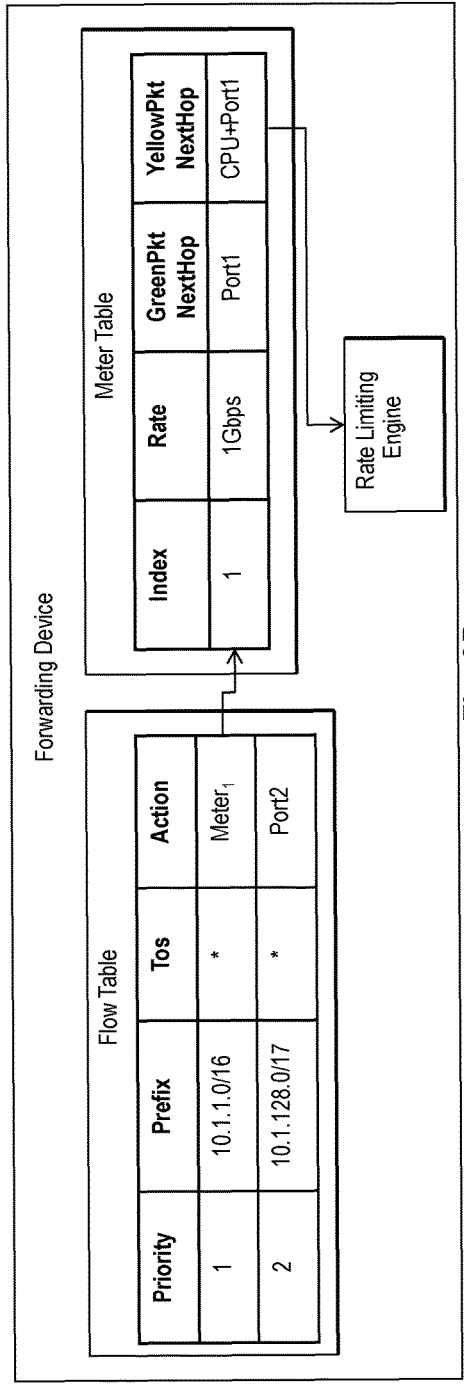
Fig. 3A
Fig. 3B

FLOW LEVEL DYNAMIC LOAD BALANCING

RELATED APPLICATIONS

The present application is a continuation of, and claims priority to, U.S. patent application Ser. No. 14/039,611, titled "FLOW LEVEL DYNAMIC LOAD BALANCING", filed on Sep. 27, 2013 and issued as U.S. Pat. No. 9,379,981, the entire contents of which are hereby incorporated by reference.

BACKGROUND

Communications networks may carry data from a source to a destination along one or more paths. Some of these paths may include fewer intermediate stops (referred to as "hops"), and may therefore be shorter than others. For example, a path that goes directly from a source to a destination is referred to as a "1-hop path." A 1-hop path may carry data to the destination faster or more efficiently than a 2-hop path, which is a path that includes a single intermediate device between the source and the destination. A path may include any number of hops.

Conventionally, available paths in the network between a source and a destination may be considered to determine which paths should be used to route data from the source to the destination. This may be accomplished by marking the paths with the fewest number of hops as the "best paths," and then routing data over the designated best paths. There may be more than one best path over which data is routed, if multiple paths tie for the fewest number of hops. The amount of data provided to each of the best paths may be balanced so that one best path does not become saturated before another.

Equal-cost multi-path routing (ECMP) is an example of such a routing strategy, an example of which is described with reference to the exemplary network depicted in FIG. 6. As shown in FIG. 6, a network 600 includes a first host 610, a second host 620, a third host 630, and a fourth host 640. Each host is associated with a nearby switch 612, 622, 632, 642 which forwards data in the form of packets from one host to another. Each switch may connect to another switch using an egress port, such as the egress ports 614, 616 of switch 612 (both of which connect switch 612 directly to switch 632).

In the example shown in FIG. 6, two paths 615, 617 are available that directly connect the first switch 612 to the third switch 632. The equal-cost multi path routing strategy divides traffic bound from the first switch 612 to the third switch 632 between the two 1-hop paths 615, 617. Thus, traffic in the network 600 may be load-balanced among multiple paths, potentially increasing bandwidth in the network over as situation in which only a single best path is used.

SUMMARY

In a conventional best-path routing strategy, such as ECMP, traffic is load-balanced only among the paths which tie for best-path status (i.e., only those paths having a minimum number of hops). Any paths between the source and destination which are longer than the shortest paths are not considered. This has the disadvantage that network resources are inefficiently used because non-shortest paths are not eligible to carry network traffic. Thus, if the best paths become saturated with traffic, additional traffic cannot be reliably sent from the source to the destination, even if unsaturated non-shortest paths between the source and destination exist.

Exemplary embodiments may allocate network traffic among multiple paths in a network, which may include one or more preferred paths and one or more alternative paths. The preferred paths may be, for example, one or more paths from a source to a destination in a network which are tied for the shortest length (e.g., the fewest number of "hops"). The alternative paths may be non-shortest paths which may be longer than the preferred paths. In one embodiment, network traffic in form of flows (e.g., groups of packets having a common destination, optionally associated with a common request or service) may be allocated to the preferred paths until the allocation of additional network traffic would exceed a predetermined data rate. Additional flows may then be sent over the alternative paths. The paths to which each flow is assigned may be dynamically updated, and in some embodiments the path assignment for a particular flow may time out after a predetermined time. Accordingly, the flow traffic of each path may be balanced based on real-time traffic information.

According to an exemplary embodiment, one or more paths between nodes in a network may be stored in a storage. The paths may be analyzed to identify one or more preferred routes from a source to a destination in the network. For example, the preferred routes may be routes that are tied for a shortest distance or fewest number of hops between the source and the destination. The paths may further be analyzed to identify one or more alternative routes from the source to the destination. The alternative routes may include one or more non-shortest paths that are longer than the preferred routes. Thus, the preferred routes may requires fewer hops between network nodes to traverse the network from the source to the destination than the alternative routes.

A received packet may be analyzed to classify the packet into a network flow, where the network flow includes a plurality of packets. For example, the received packet may be classified into the network flow based on one or more of a destination IP address of the received packet or a DSCP value of the received packet.

One or more rules for instructing a forwarding device (or multiple forwarding devices) to assign future received packets associated with the network flow to either the preferred routes or the alternative routes may be generated. For example, future received packets associated with the network flow may be assigned to a preferred route if the network flow is associated with a low delay requirement. Alternatively or in addition, future received packets associated with the network flow may be assigned to the one or more alternative routes if the network flow is not associated with a delay requirement.

The rules may be transmitted to the forwarding device for application by the forwarding device. In some embodiments, the forwarding device may be a switch.

In some embodiments, one or more flow tables may be stored, where the flow tables describe paths in the network. Based on information in the flow tables, the preferred and alternative paths may be selected.

According to another exemplary embodiment, two or more "next hops" in the network may be stored. The next hops may include a preferred next hop and an alternative next hop, where the preferred next hop is a device in the network that lies along a shorter route to a destination of a received packet than the alternative next hop. The preferred next hop and/or the alternative next hop may be identified using an egress port identifier.

Further, routing rules may be stored, where the routing rules specify a condition that defines whether a received packet will be forwarded on the preferred next hop or the alternative next hop, based on a multi-packet network flow associated with the received packet. In some embodiments, a packet may be classified into a flow based on one or more of a destination IP address of the received packet or a DSCP value of the received packet.

A network packet may be received and analyzed in view of the condition. Based on the analysis, the preferred next hop or the alternative next hop may be selected, and the packet may be forwarded to the selected next hop.

In some embodiments, a copy of the received packet may be forwarded to a controller for flow classification. a rate at which packets are forwarded to the controller may be limited in order to ensure that the controller is not overwhelmed.

According to another embodiment, a network packet associated with a source and a destination may be received and classified into a flow. The flow may include a plurality of packets that are associated with each other. For example, the flow may include a plurality of packets sent from a common source to a common destination, and/or may include a plurality of packets associated with a common service and a common source. Alternatively or in addition, a received packet may be classified into a flow based on one or more of a destination IP address of the received packet or a DSCP value of the received packet. Further, the flow may be classified based on a latency tolerance of the flow.

A list of paths in the network between the source and the destination may be accessed. The paths may include one or more preferred paths and one or more alternative paths. The one or more preferred paths may require fewer hops to traverse the network between the source and the destination than the one or more alternative paths.

The flow may be assigned to either a selected preferred path or a selected alternative path, based on the latency tolerance of the flow. In some embodiments, a traffic congestion of the one or more preferred paths may be determined. The flow may be assigned to either the selected preferred path or the selected alternative path is further performed based on the determined traffic congestion.

The exemplary embodiments described herein may allow network traffic to be load-balanced among preferred and alternative routes on a per-flow basis. The load balancing may be performed based on real-time analysis of traffic congestion in the network, thus improving network resource usage by leveraging the alternative paths when the preferred paths are congested, while still allowing high-priority flows to be transmitted on the more efficient preferred paths.

BRIEF DESCRIPTION OF THE DRAWINGS

FIG. 3A depicts an exemplary forwarding device including a flow table, meter table, and rate limiting engine according to an exemplary embodiment.

FIG. 3B depicts an exemplary forwarding device including a flow table, meter table, and rate limiting engine according to another exemplary embodiment.

DETAILED DESCRIPTION

Networks, such as data center networks, often employ multiple parallel paths between forwarding devices, such as switches, to provide high bandwidth among hosts. As used herein, a host may refer to a source or a destination of data sent through a network. A host may be, for example, a server or a user device. A forwarding device may refer to a device along the path between the source and destination which receives data and forwards the data to the next device along the path (which may be the end destination of the data or another forwarding device). A forwarding device may be, for example, a switch or a router.

Devices in the network may be connected by links, which may include one or more transmission mediums, such as copper wire, fiber optic cable, or radio signals carrying information from one device in the network to another. A path may be made up of hops, where each hop may correspond with a link between the sending device and receiving device. The aggregate of the hops from the source to the destination may form a path between the source and destination.

The shortest path or best path may refer to a path in the network with the fewest number of hops from the source to the destination. There may be multiple shortest paths or best paths if more than one path is tied for the fewest number of hops. A non-shortest path may refer to any path that has more hops than the shortest path.

Figure 6:
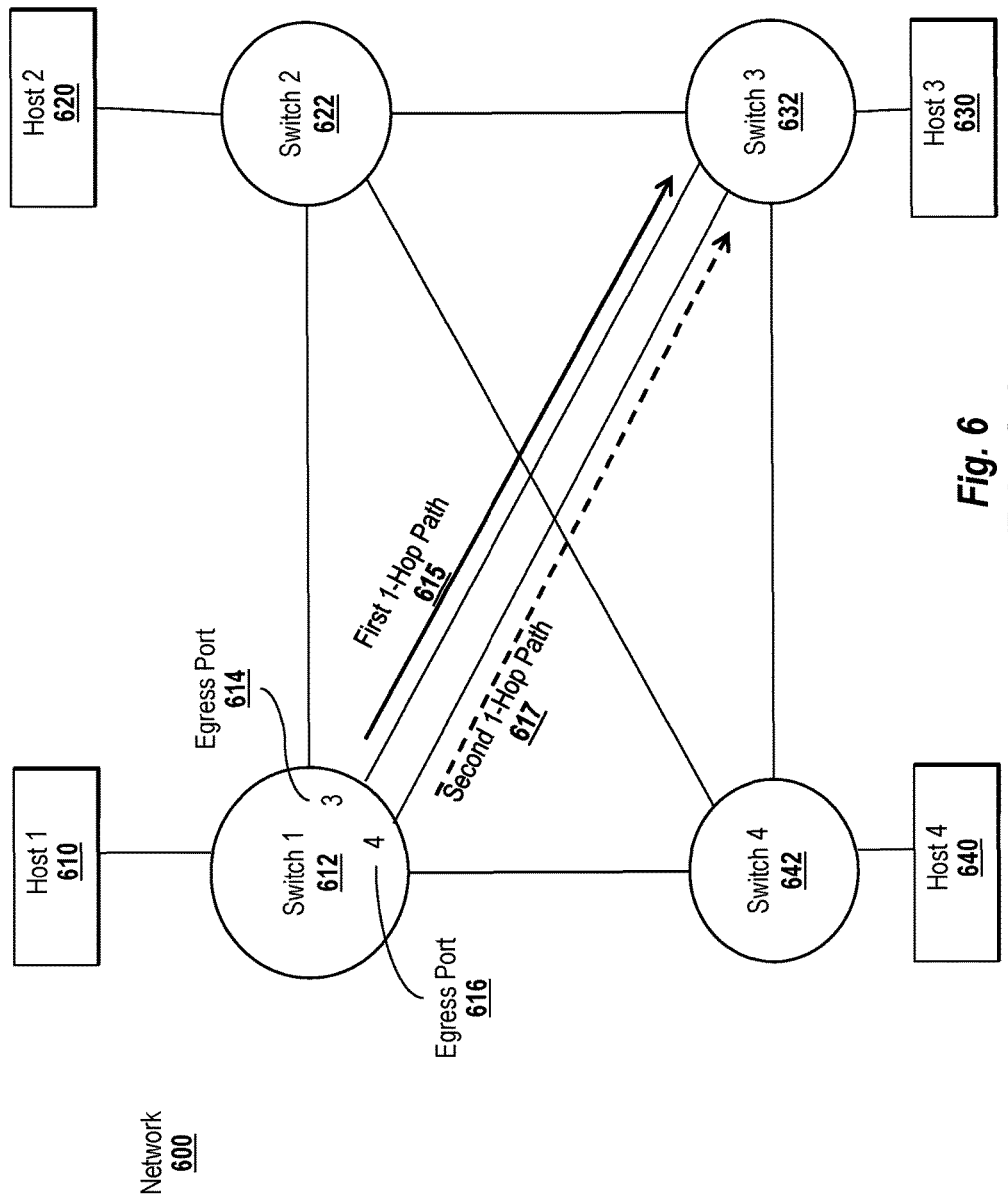
FIG. 6 depicts a conventional communications network carrying information between two hosts using two communications paths.

In some examples provided herein (such as FIGS. 1 and 6), a host may be associated with a forwarding device such that, for purposes of path calculation, the host and forwarding device are treated as a single entity. Thus, the path from the first host 610 to the third host 630 in FIG. 6 is considered a 1-hop path (Host1/Switch1 to Host3/Switch3) rather than a 3-hop path (Host1 to Switch 1 to Switch 3 to Host 3).

Traditionally, equal-cost multi-path (ECMP) routing has been used to balance traffic evenly among the shortest paths. Non-shortest paths are not considered or used in ECMP. However the shortest paths alone often do not provide enough capacity to handle bursts of traffic. Thus, when all of the shortest paths become saturated using conventional routing techniques, it may not be possible to re-route traffic in the network over unsaturated non-shortest paths. Accordingly, network resources may not be efficiently utilized.

Exemplary embodiments described herein may allocate network traffic among multiple paths in the network, which may include one or more preferred paths (e.g., shortest paths) and one or more alternative paths (e.g., non-shortest paths). One possible approach, described in U.S. patent application Ser. No. 14/013,832, entitled "Rate-Based Load Balancing" and filed on Aug. 29, 2013 (the contents of which are incorporated herein by reference and referred to hereinafter as the "'832 application"), is to allocate network packets received at a forwarding device, such as a switch, to preferred and alternative paths in the network based on a saturation level of the preferred paths.

While the approach described in the '832 application is well-suited to many applications, in some instances it would be preferable to allocate network traffic to preferred and alternative paths according to different metrics.

For example, in the approach of the '832 application, network traffic is allocated to preferred and alternative paths at a very granular level (e.g., the packet level). Accordingly, traffic may be assigned to paths in such a way that the traffic level on the paths approaches the saturation point of each path very closely.

However, network traffic is typically not requested from an end-device in the form of individual packets. Rather, the end-device may request a larger "chunk" of data, which is then broken into packets. A group of packets having common elements, such as a common destination and/or a common source, is referred to as a flow or network flow. Optionally, a flow may be associated with other common elements, such as a common request or a common service.

When traffic is assigned to paths in the network on a packet-by-packet basis, as in the approach of the '832 application, it is possible that some packets of a flow will be received out-of-order. For example, packets of the same flow may be sent over different paths, as in the case where a first packet is sent over an alternative (non-shortest) path and a subsequent packet is sent over a preferred (shortest) path. Thus, the packets may arrive in the wrong order and may be reassembled at or near the destination of the packets, which may require additional processing resources. In order to avoid the possibility of reassembling received packets, the packets may first be classified into flows and then assigned to a preferred or alternative path on a per-flow basis. Therefore, the packets are more likely to be received in the correct order.

The decision of whether to assign traffic to paths in the network on a per-packet basis (as in the approach of the '832 application) or on a per-flow basis (as described herein) may involve a trade-off between assigning network traffic at a finer degree of granularity versus avoiding the need to potentially rearrange packets when they are received. Assigning traffic at a finer degree of granularity may make better use of network resources (e.g., traffic can be allocated to network paths until the paths are very close to their saturation points), while avoiding rearrangement of the packets may make better use of processing resources at or near the destination of the packets. Exemplary embodiments described herein address the latter option of assigning network traffic to network routes on a per-flow basis.

Figure 1:
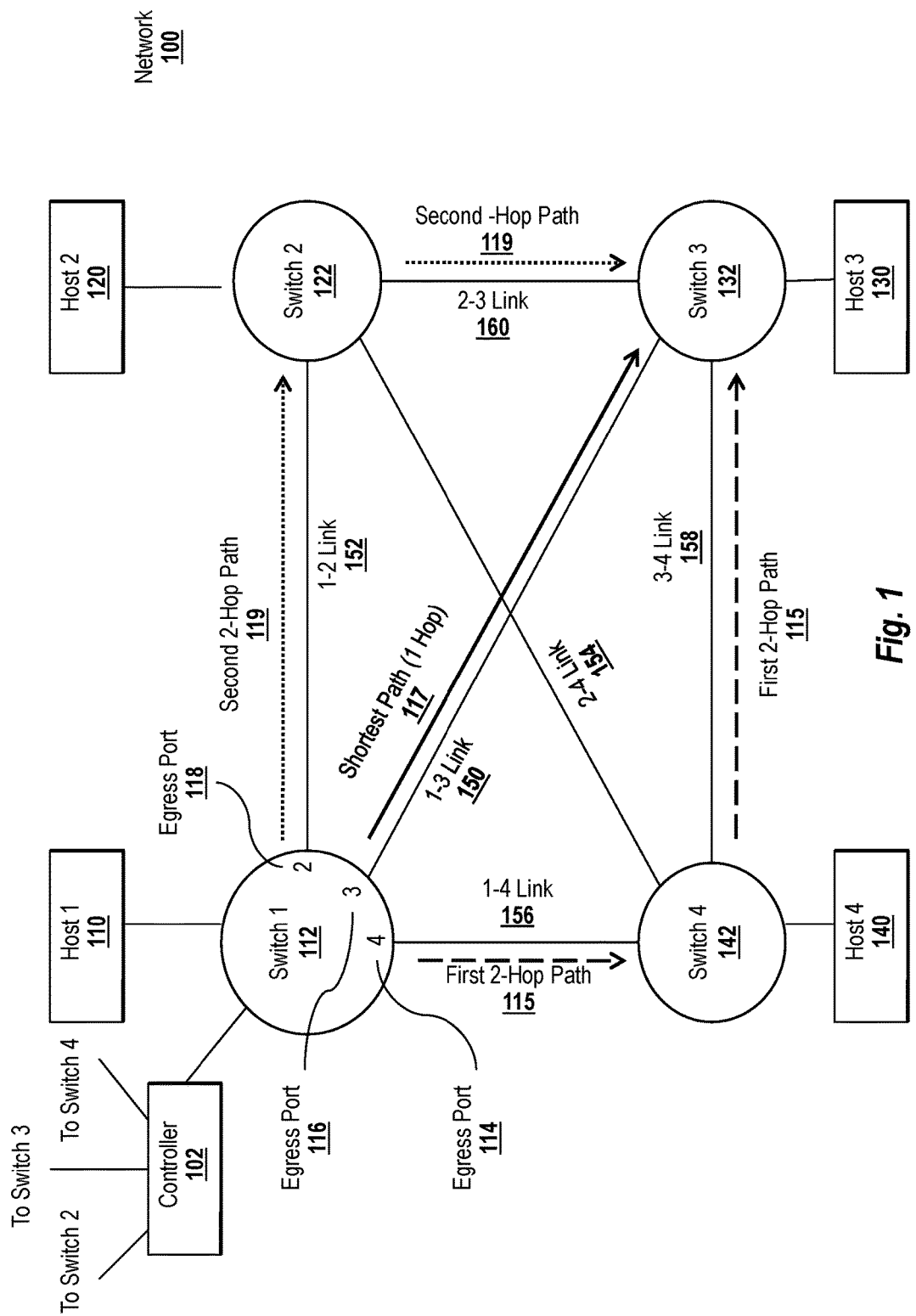
FIG. 1 depicts an exemplary communications network carrying information between two hosts using three communications paths.

FIG. 1 shows the general principle of an exemplary flow-based load balancing mechanism according to one embodiment of the present invention. As shown, the network 100 includes four hosts 110, 120, 130, 140. The hosts may be associated with one or more forwarding devices, such as switches 112, 122, 132, 143 (respectively).

Each forwarding device may be connected to a neighboring forwarding device using a link. For example, the first switch 112 connects to the third switch 132 over the link 150. In the example of FIG. 1, each link 150, 152, 154, 156, 158, 160 is bidirectional.

One or more paths may exist between the forwarding devices over the links. For example, three paths 115, 117, 119 exist between the first switch 112 and the third switch 132. The shortest path 117 carries traffic directly from the first switch 112 to the third switch 132 over the link 150. Thus, the shortest path 117 is a 1-hop path. The two non-shortest paths 115, 119 each include two hops.

On the first switch 112, each path 115, 117, 119 may be associated with an egress port 114, 116, 118 (respectively). By transmitting packets on a designated egress port, the forwarding device (e.g., the first switch 112) may place the packets onto the first hop of a chosen path. For example, transmitting a packet using egress port 116 may cause the packet to traverse the network on the shortest path 117. On the other hand, transmitting a packet on the egress port 114 may cause the packet to traverse the network on the first 2-hop path 115.

One or more of the forwarding devices may be connected to a controller 102, which may analyze the topology of the network (e.g., the structure of the network including available devices, links, and/or paths in the network), classify packets into flows, and instruct the forwarding devices which of the available paths to use for a particular flow. Exemplary embodiments may perform load balancing among the shortest path 117 and the non-shortest paths 115, 119. For example, traffic in the form of packets may be routed on the shortest path 117 until the shortest path 117 becomes saturated. At that point, the traffic may be redirected one to the non-shortest paths 115, 119.

Consider an example in which each of the links 150, 152, 154, 156, 158, 160 is capable of carrying 1 Gbps of traffic, where the first host 110 has 2 Gbps of traffic to send to the third host 130. Using the techniques described herein, the controller 102 may perform load balancing, routing the first 1 Gbps of traffic onto the shortest path 117. Once 1 Gbps of traffic has been allocated to the shortest path 117, the controller 102 may divide the remaining 1 Gbps of traffic between the two available non-shortest paths 115, 119 (e.g., each path may receive 0.5 Gbps of traffic). Accordingly, traffic can be efficiently routed from the first host 110 to the third host 130, making full use of available network resources.

Although FIG. 1 depicts an example including 1-hop paths and 2-hop paths, one of ordinary skill in the art will recognize that the shortest path in a network need not be a 1-hop path, but may have any number of hops (so long as the shortest path consists of the hops that are tied for the fewest in number between a source and a destination in the network). Alternatively, the shortest path may be determined by a round-trip time. Similarly, the non-shortest path need not have 2-hops, but may include any number of hops that is larger in number than the shortest path.

In some embodiments, multiple tiers of path lengths may be used. For example, the shortest path(s) may serve as the preferred paths for traffic, while the non-shortest path(s) having the next-fewest number of hops (after the shortest paths) may serve as alternative paths. The non-shortest paths may be those paths which would be the shortest paths in the network, if the actual shortest paths were removed from consideration.

When the non-shortest paths become saturated, traffic may be routed to the next non-shortest paths as secondary alternatives. For example, in a network with a 1-hop path, a 2-hop path, and a 3-hop path, traffic may first be directed to the 1-hop path, then when the 1-hop path becomes saturated traffic may be routed to the 2-hop path, then when the 2-hop path becomes saturated traffic may be routed to the 3-hop path.

Each tier of preferred and alternate routes is referred to herein as a multipath group. In one embodiment, a multipath group includes the paths between a source and destination having the same number of hops. For example, the 1-hop paths between a source and a destination may be considered one multipath group. The 2-hop paths may be considered a second multipath group, and so on.

Load balancing may be performed among the paths within a multipath group. When one or more links of each path in a multipath group become saturated such that additional traffic cannot be efficiently transmitted on any of the paths, the next-most-efficient multipath group may be selected and network flows may be load balanced among this next multipath group.

Figure 2:
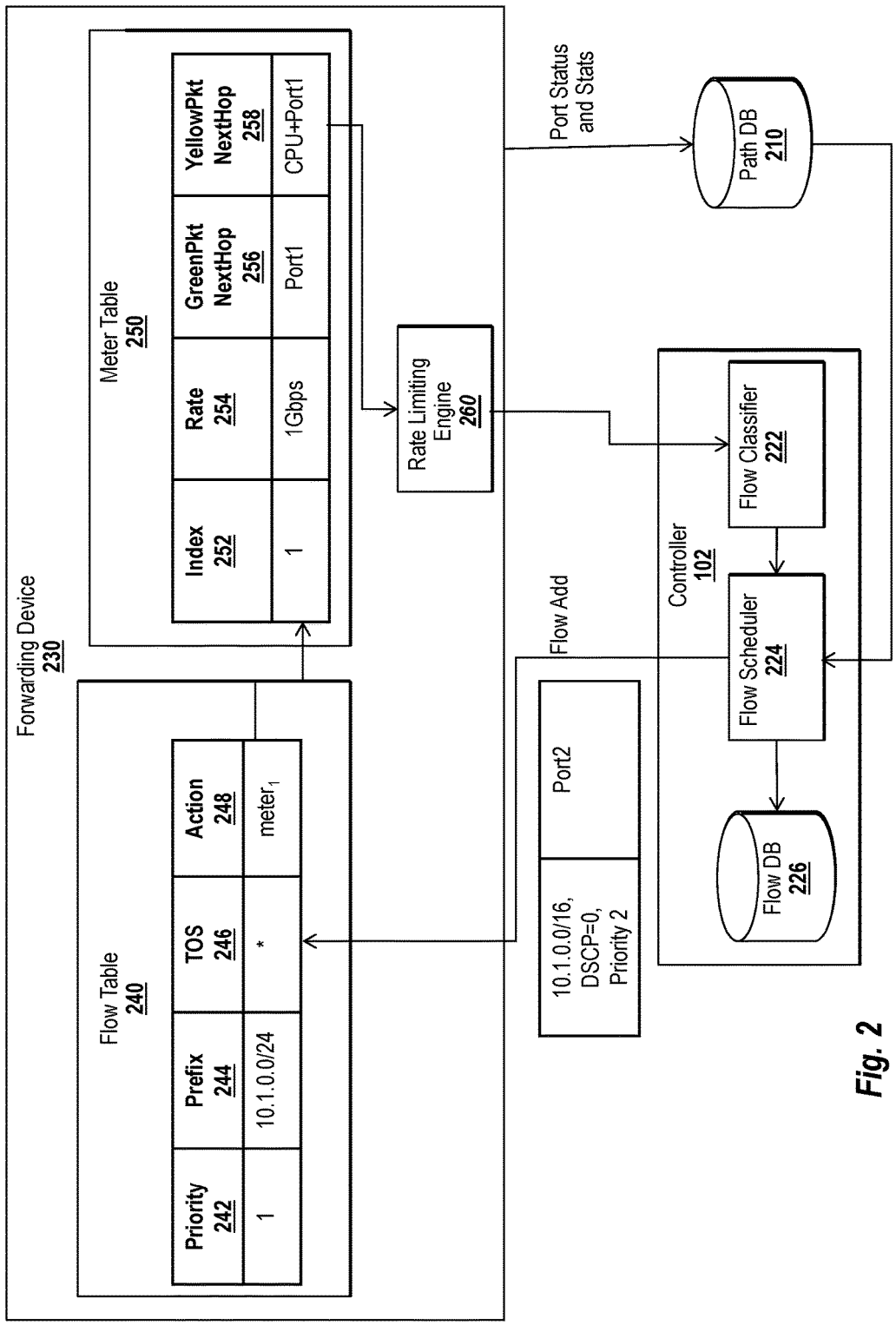
FIG. 2 depicts an exemplary system for performing dynamic load balancing at a level of a flow in a network.

In order for the forwarding devices to transmit packets on an appropriate path in the appropriate multipath group in accordance with an exemplary dynamic flow-based load balancing technique, each of the forwarding devices may maintain a number of forwarding tables for determining which egress port to use to transmit a received packet. For example, FIG. 2 depicts exemplary forwarding tables established according to rules set by a controller 102 based on information in a path database 210. The exemplary forwarding tables may be resident on a forwarding device 230 and include an exemplary flow table 240 and meter table 250.

The path database 210 may maintain a list of paths in the network between a source and destination pair. The path database 210 may poll forwarding devices (such as switches) to retrieve the link status of links associated with the forwarding devices (e.g., links accessible to the forwarding devices) and the utilization of the links. Alternatively, a forwarding device may send a notification of a link status change directly to the path database 210 without prompting. The path database 210 may use the link and utilization information to calculate a path in the list based on the topology of active links in the network. Any change in a link status may trigger a recalculation of any paths related to the link whose status was changed. The received utilization of the links may be used to determine whether a path is congested. The paths for a given source/destination pair may be sorted in the path database 210 based on a hop count representing a number of nodes in the path.

The path database 210 may be maintained by, and reside on, a device separate from the controller 102, such as custom hardware, a server, a router, a switch, a computer, etc. Alternatively, the path database 210 may be maintained by, and reside on, the controller 102.

The controller 102 may maintain a flow classifier 222, a flow scheduler 224, and a flow database 226. The controller may be any suitable device, such as a custom piece of hardware, switch, router, computer, server, etc.

The flow classifier 222 may receive network traffic in the form of packets from the forwarding device 230. In some embodiments, the flow classifier 222 may receive the packets in a rate-limited fashion so that the processor of the controller 102 is not overwhelmed. The flow classifier 222 may identify which flow a packet belongs to by scanning the packet header.

Flows may be identified using a number of parameters, such as the destination host prefix of packets associated with the flow, the source of the flow, a request associated with the flow, and a service type of the flow. The more parameters that are specified for a flow, and the more detailed those specifications are, the more "specific" the flow is considered to be. For example, packets sent to a common destination may be considered to belong to a first flow, whereas packets sent to a common destination and associated with a common service type may be considered to belong to a second flow that is more specific than the first flow. Some parameters may allow for more specificity within the parameter itself. This may be the case, for example, with the host prefix, which may become more specific as further subnets are specified for the prefix.

In one embodiment, the packet may be classified according to the destination of the packet and/or the source of the packet, as well as the type of service ("TOS") of the packet as indicated by an IP TOS and/or DSCP header value. Accordingly, traffic associated with different services may be treated differently by the controller 102 and/or the forwarding device 230. For example, traffic associated with a service having no delay requirement may be scheduled onto a non-shortest path, while traffic associated with a service having a maximum acceptable amount of delay may be scheduled onto a shortest path in the network.

The flow scheduler 224 may accept a list of available paths from the path database 210 and/or the utilization levels of the paths. Based on the received information, the flow scheduler 224 may determine whether the path may tolerate additional latency (e.g., whether the path is able to accept more traffic). If the flow scheduler 224 determines that a path in the network can tolerate additional latency, the flow scheduler 224 may assign a selected flow to the path.

The flow scheduler 224 may assign flows to preferred (e.g., shortest) paths first, and then may assign flows to alternative (e.g., non-shortest) paths when the flow scheduler 224 determines that the preferred paths are unable to tolerate additional latency. In another embodiment, the flow scheduler 224 may sequentially assign flows associated with a low latency requirement (e.g., high-priority traffic) to preferred paths until each of the preferred paths becomes saturated. Flows that are not associated with a low latency requirement (e.g., low-priority traffic) may be sequentially assigned to alternative paths based on the utilization levels of the alternative paths, until each of the alternative paths becomes saturated.

In order to schedule the flows to particular paths, the flow scheduler 224 may maintain a flow database 226. The flow database 226 may be a superset (e.g., a union) of the flow tables 240 maintained by forwarding devices 230 accessible to the controller 102.

The flow database 226 may be used to reassign flows to new paths after a certain amount of time. For example, as noted above more specific flows may be assigned a higher priority than less specific flows. In the event that a specific flow is assigned to a non-shortest path (e.g., because all shortest paths have been saturated), the flow may be assigned a garbage collection timer based on a predetermined time limit or dynamically determined (e.g., based on network conditions) time limit. In some embodiments, the time limit may be randomly assigned a value, with a mean of a few minutes. When the timer expires, the flow may be deleted from the flow database 226 and subsequent packets received at the forwarding device 230 from the flow may be reassigned a new path by the flow classifier 222 and the flow scheduler 224. For example, the flow may be reassigned to a shortest path. In the event that assigning the flow to a shortest path causes congestion on the shortest path, the flow scheduler 224 may reschedule the flow to a non-shortest path and reset the garbage collection timer (potentially with a new time limit).

When the flow scheduler 224 schedules a new flow (or reschedules an existing flow) to a selected path, the flow scheduler may identify the egress port of the forwarding device 230 associated with the next hop on the path and may add the flow to a flow table 240 of the forwarding device 230. For example, the flow may be added by transmitting a "Flow Add" message in accordance with a software defined networking protocol, such as the OpenFlow protocol. The "Flow Add" message may be sent to the forwarding device 230.

The forwarding device 230 may be any device which receives and forwards traffic (e.g., in the form of packets) in the network. Examples of forwarding devices 230 include switches, routers, and custom forwarding devices. The forwarding device may consult a flow table 240 and/or a meter table 250 in order to forward the traffic.

The flow table 240 may be a table consulted by the forwarding device 230 when the forwarding device 230 receives a packet from a host. The destination of the packet may be identified using a destination host prefix, which may match a corresponding prefix field 244 in the flow table 240. Upon looking up the host prefix in the prefix field 244, a corresponding action 248 may be indicated. The action may include consulting another of the forwarding tables for further instructions as to how to perform load balancing among designated routes. For example, in the embodiment shown in FIG. 2, packets destined for a host prefix of "10.1.0.0/24" are designated for an action of "$meter_1$", which indicates that the forwarding device 230 should consult the first entry of the meter table 250 to determine how to route the packet.

Multiple entries in the flow table 240 may be associated with a single host prefix 242. In such a case, each entry may be assigned a priority 242. Higher priority actions may override lower priority actions.

In some embodiments, an entry in the flow table 240 may be associated with a type of service ("TOS") field 246, which indicates a service type associated with a particular flow. Examples of service types include mapping services, email services, streaming audio/visual services, etc. Classifying a flow according to a service type is optional, and some or all of the flows may be classified based on service types or not classified based on service types. In the example depicted in FIG. 2, the flow associated with the prefix 10.1.0.0/24 is associated with a TOS of "*", indicating a wildcard. The use of a wildcard may indicate that any TOS associated with packets received with the designated host prefix may be classified into the same flow. If a TOS is specified in the TOS field 246, then the flow may be considered to be more specific than a flow for which no TOS is specified.

Based on the information in the flow table, the forwarding device may perform a lookup in to the meter table 250 to determine on which egress port to transmit the packet. The meter table 250 may include a number of entries identified by indices 252. In one embodiment, each index 252 may indicate routing procedures for a different flow.

The remaining fields of the meter table may indicate, for different indices 252, a corresponding condition and action to be taken depending on whether the condition has been met. The condition may be, for example, a condition that indicates whether one or more links along a preferred path in the network has been saturated.

For example, in FIG. 2 the condition associated with an index "1" is a particular rate 254. The rate 254 may be a rate an available throughput for the preferred path(s) in the network. The rate 254 may be predetermined and programmed into the meter table by a network administrator or by the controller 102, or alternatively the rate 254 may be evaluated (e.g., by the controller 102) and determined based on an analysis of the links in the path. If there is more than one link in the path, then the acceptable rate of the most limited link in the path may be used as the rate 254.

In the example of FIG. 2, a rate 254 of 1 Gbps is indicated for the preferred path associated with the index "1." This may indicate that the preferred path is capable of carrying 1 Gbps of information. It is understood that link capacities are typically greater than 1 Gbps; a threshold of 1 Gbps is used herein merely for simplicity.

The forwarding device 230 associated with the meter table 250 may perform a real-time analysis of the traffic on the preferred path associated with the index 252. Alternatively another device, such as the controller 102 or a different device in the network, may perform a real-time analysis of the traffic on the preferred path and send the results of the analysis to the forwarding device 230. The forwarding device 230 may use the analysis to determine whether the condition (e.g., traffic on the preferred path exceeds the rate 254) has been fulfilled.

The forwarding device 230 may take different actions with the packet depending on whether the condition has been fulfilled. For example, if the traffic on the preferred path does not exceed the rate 254, then the forwarding device 230 may mark the received packet that is scheduled for transmission as a "green" packet, indicating that the packet should be transmitted on the unsaturated preferred path. On the other hand, if the traffic on the preferred path does exceed the rate 254, then the forwarding device 230 may mark the received packet that is scheduled for transmission as a "yellow" packet, indicating that the packet should be transmitted on an alternate path.

This example, in which the packet is marked as "green" or "yellow" depending on network conditions, is intended for illustrative purposes only. It is not necessary for the forwarding device to actually mark the packet in any way. Rather, the forwarding device 230 may treat received packets differently depending on whether the condition in the meter table has been fulfilled, without actually marking the packets.

Furthermore, the example of FIG. 2 includes a preferred next hop action for "green" packets and an alternative next hop action for "yellow" packets. Additional next hop actions may also be used in the event that more than two next hop actions are available, (e.g., a "red" next hop action if a third, next-best-alternate, egress port is provided as in the three-tiered example above). In this case, multiple rates 254 may be specified, such as a first rate for the preferred next hop action and a second rate for the first alternate next hop action.

The meter table 250 may include entries instructing the forwarding device 230 what to do with a packet marked as "green" or "yellow." For example, a first entry 256 may be used to determine the next hop out of the forwarding device to be used for a green packet, while a second entry 258 may be used to determine the next hop out of the forwarding device to be used for a yellow packet. In exemplary embodiments, the next hop may be specified by an egress port on which the forwarding device 230 may transmit the received packet.

In some embodiments, the meter table 250 may instruct the forwarding device 230 to forward a copy of the received packet to the controller 102 for classification or reclassification (e.g., the instruction "CPU" in FIG. 2). For example, this may be done when the forwarding device 230 identifies that a particular link has become saturated, and therefore traffic sent on the link that was formerly classified as "Green" traffic is now being classified as "yellow" traffic. In this way, the flow may potentially be rescheduled to a different path that is less saturated. The different path may be a preferred path (e.g., if the traffic was originally assigned to a preferred path, the controller may select another preferred path in the same multipath group as the original preferred path) or an alternative path (e.g., if not more unsaturated preferred paths exist).

In order to avoid overwhelming the processor of the controller 102 during bursts of traffic, the forwarding device 230 may employ a rate limiting engine 260. The rate limiting engine 260 may accept packets bound for the controller 102 and sends the packets to the controller at a predetermined rate (e.g., not more than N packets per second, where N is a configurable parameter selected based on the processing capabilities of the controller 102).

Although the example depicted in FIG. 2 uses two forwarding tables, other configurations are possible. Any suitable data structure may be used, such as a linked list, database, or suitable instructions representing forwarding logic for forwarding the received packet, so that the data structure need not be a table. Moreover, the functionality of the flow table 240, meter table 250, and/or the rate limiting engine 260 may be combined or divided into one, two, three, or more entities.

FIGS. 3A and 3B depict two examples of different flow assignments in an exemplary forwarding device.

FIG. 3A depicts the flow table that results when the flow table 240 of FIG. 2 is updated with the "Flow Add" message sent by the controller 102 (i.e., the message indicating that traffic having a host prefix of 10.1.0.0/16 and a DSCP value of 0 should be sent on egress port #2 of the forwarding device 230, with priority 2). As shown in FIG. 3A, a new entry is added to the flow table 240. The priority field is set to "2", the prefix field is set to "10.1.0.0/16", the TOS field is set to "DSCP=0," and the "Action" to be taken is set to "Port2," indicating that any packet received with the previous three parameters should be automatically forwarded on egress port 2. As can be seen from this example, the indicated action does not reference the meter table 250, and hence the meter table 250 does not need to be updated. Such an entry might be used if, for example, the received packets associated with this flow are to be sent on a non-shortest path (e.g., in the case of a low-priority packet, as might be the case for a packet having a DSCP value of "0").

When a packet is received by a forwarding device 230 having the flow table of FIG. 3A, the forwarding device 230 may first check the host prefix of the packet and match the host prefix to an entry in the flow table 240. In this case, the forwarding device 230 may determine that two entries are associated with the host prefix 10.1.1.0/16. Accordingly, the forwarding device 230 may consult the entry having the highest priority, which is "2" in this case. The forwarding device thus checks to see if the TOS field of the packet matches the TOS value for the priority 2 entry (e.g., is the packet's TOS value "DSCP=0"?). If so, the forwarding device 230 would automatically forward the packet on egress port 2. If not, the forwarding device 230 would continue to check entries in the flow table 240 based on their priorities. In this case, the next-highest priority entry (i.e., the first entry having a priority of "1") indicates that a packet with 10.1.1.0/16 host prefix and any TOS (indicated by the "*" wildcard) should be forwarded according to the action indicated in the first entry of the meter table.

FIG. 3A depicts an example in which a more specific flow is assigned an entry in the flow table 240 based on the TOS field of the packet. However, there are alternative ways to measure the specificity of a packet. For example, FIG. 3B depicts an exemplary entry in a flow table for packets having a more specific IP subnet (e.g., 10.1.128.0/17). Such traffic is scheduled to a non-shortest path using egress port 2 in FIG. 3B. Other traffic from the host prefix 10.1.0.0/16 may be forwarded according to the action indicated in the first entry of the meter table.

Figure 4:
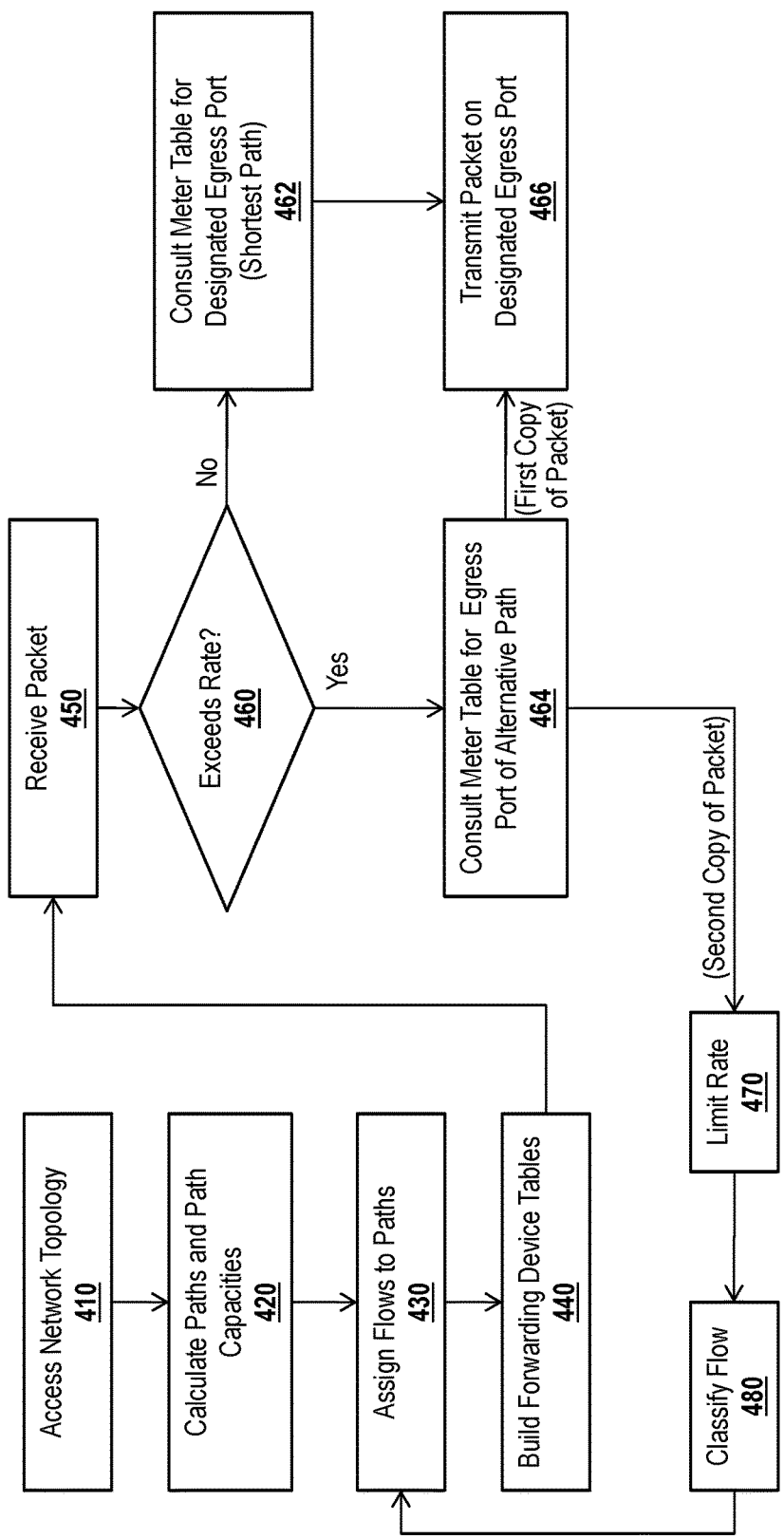
FIG. 4 is a flowchart of an exemplary process for performing dynamic load balancing at a level of a flow according to an exemplary embodiment.

FIG. 4 is a flowchart describing the actions taken by the controller 102 and/or the forwarding device 230 for building the forwarding tables of the forwarding device 230 and processing received packets.

At step 410, the path database 210 and/or controller 102 may access the network topology and/or available paths in the network as provided to the path database 210 by the forwarding devices of the network. The network topology may include a description of forwarding devices in the network, host prefixes associated with the forwarding devices, links between the forwarding devices, and capacities of the links, among other features.

At step 420, the path database 210 and/or controller 102 may use the network topology to calculate paths between the forwarding devices, and the capacities of those paths. The path capacities may be determined by taking the smallest capacity of a link on the path. In one embodiment, the path database 210 may construct a graph representation of the network, where the nodes of the graph represent the forwarding devices and the edges of the graph represent links between the forwarding devices. The edges may be assigned weights corresponding to the path capacities, and the graph may be traversed from the source to different destinations in order to determine paths and path capacities.

At step 430, the path database 210, flow classifier 222, and/or flow scheduler 224 may use the calculated paths and path capacities assign flows to paths in the network. In one embodiment, the controller 102 may sequentially assign flows to one or more preferred paths (optionally performing load balancing among the available preferred paths) until the preferred paths become saturated. The controller 102 may then sequentially assign flows to alternative paths (optionally performing load balancing among the available alternative paths) until the alternative paths become saturated. Alternatively or in addition, the controller 102 may assign high-priority traffic (e.g., traffic associated with a latency requirement) to preferred paths until the preferred paths become saturated. Traffic that is not associated with a latency requirement may be assigned to alternative paths.

At step 440, the controller 102 may use the flow assignments determined in step 430 to build the forwarding tables of forwarding devices in the network. For example, the controller 102 may send a "flow add" message according to a software defined networking protocol to a forwarding device to cause the forwarding device to add the flow to the forwarding device's forwarding tables. The forwarding tables may be updated using the information determined by the controller 102 at step 430.

At step 450, the forwarding device may receive a packet, such as a packet from a host or from another forwarding device. The forwarding device may consult the forwarding device's flow table to determine an appropriate action to take with the packet. The forwarding device's flow table may instruct the forwarding device to consult an appropriate entry in the forwarding device's meter table. Alternatively, the flow table may directly specify an egress port on which to transmit the packet (in which case processing may proceed directly to step 466).

The meter table may include a condition, such as a condition that traffic on the preferred path for the packet not exceed a designated rate. At step 460, the forwarding device may retrieve the designated rate from the meter table and compare the condition to a traffic measurement. The traffic measurement may be generated by the link monitor of the forwarding device, by the controller, or by another device in the network, such as a custom device designated to perform real-time monitoring of the status of links and/or paths in the network.

If the traffic measurement does not exceed the designated rate, then the forwarding device may determine that the preferred path should be used to forward the packet and processing may proceed to step 462. If the traffic measurement does exceed the designated rate, then the forwarding device may determine that an alternate path should be used to forward the packet and processing may proceed to step 464.

At step 462, where it has been determined that a preferred path should be used to forward the packet, the forwarding device may retrieve the egress port to be used to transmit the packet from the meter table. The packet may be transmitted on the designated egress port at step 466.

At step 464, where it has been determined that an alternative path should be used to forward the packet, the forwarding device may consult the meter table to determine the alternative path to be used. The packet may be transmitted on the designated egress port at step 466.

Optionally, at step 464 the forwarding device may also forward a copy of the packet to the controller for reclassification. This may allow a flow which is currently being transmitted on a congested path to be reclassified for transmission on a less congested path. At step 470, a rate limiter may limit the rate at which such copies of packets are sent to the controller in order to avoid overwhelming the controller. At step 480, the controller may classify (or reclassify) the flow, and processing may return to step 430.

Accordingly, using the techniques described above, the forwarding device may perform dynamic flow-based load balancing among a set of preferred and alternative paths in the network.

Figure 5:
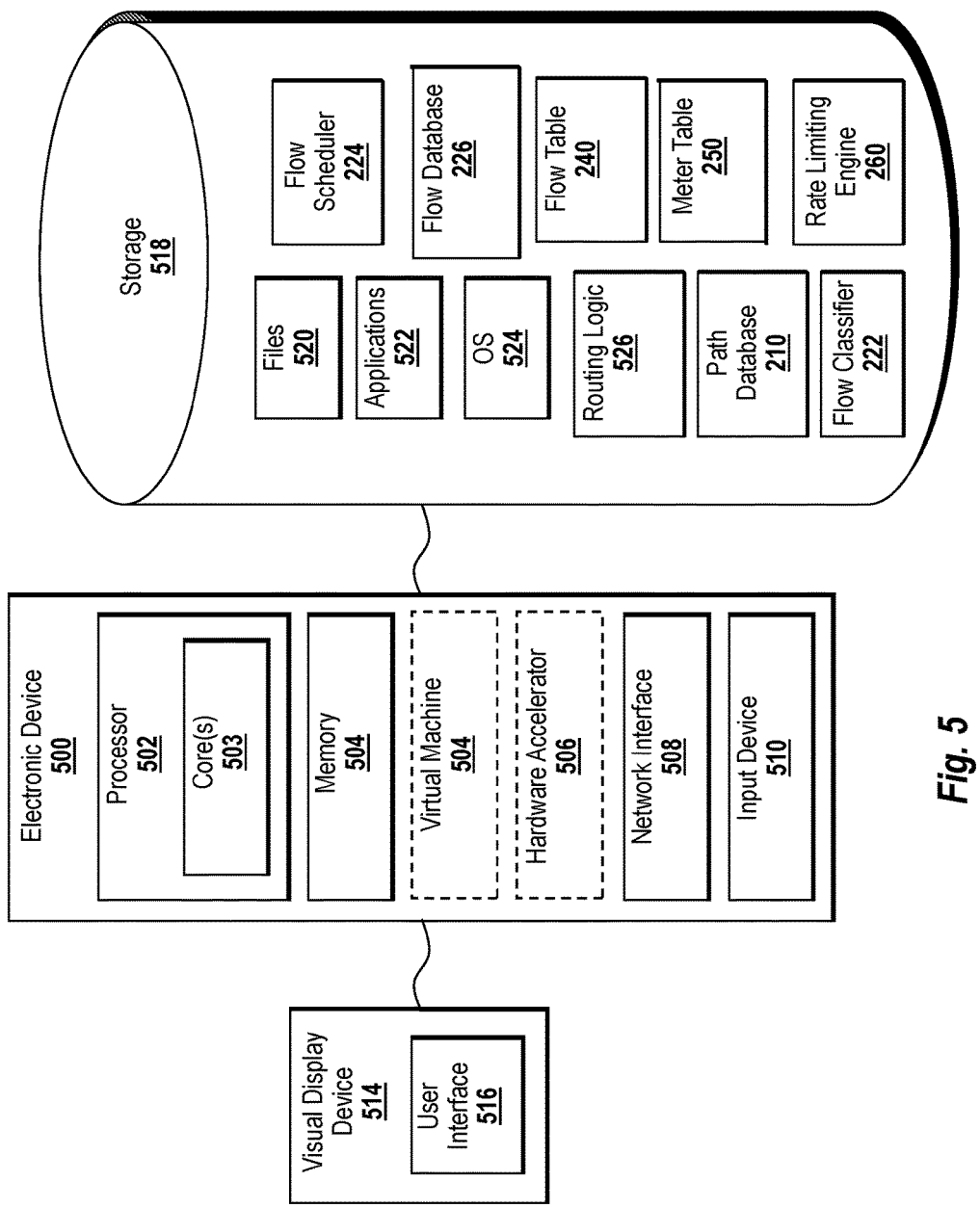
FIG. 5 depicts an exemplary computing device suitable for use with exemplary embodiments.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 5 depicts an example of an electronic device 500 that may be suitable for use with one or more acts disclosed herein.

The electronic device 500 may take many forms, including but not limited to a switch, a router, a computer, workstation, server, network computer, Internet appliance, mobile device, a pager, a tablet computer, a smart sensor, application specific processing device, etc.

The electronic device 500 is illustrative and may take other forms. For example, an alternative implementation of the electronic device 500 may have fewer components, more components, or components that are in a configuration that differs from the configuration of FIG. 5. The components of FIG. 5 and/or other figures described herein may be implemented using hardware based logic, software based logic and/or logic that is a combination of hardware and software based logic (e.g., hybrid logic); therefore, components illustrated in FIG. 5 and/or other figures are not limited to a specific type of logic.

The processor 502 may include hardware based logic or a combination of hardware based logic and software to execute instructions on behalf of the electronic device 500. The processor 502 may include logic that may interpret, execute, and/or otherwise process information contained in, for example, the memory 504. The information may include computer-executable instructions and/or data that may implement one or more embodiments of the invention. The processor 502 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 503. Moreover, the processor 502 may include a system-on-chip (SoC) or system-in-package (SiP).

The electronic device 500 may include one or more tangible non-transitory computer-readable storage media for storing one or more computer-executable instructions or software that may implement one or more embodiments of the invention. The non-transitory computer-readable storage media may be, for example, the memory 504 or the storage 518. The memory 504 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 500 may include a virtual machine (VM) 505 for executing the instructions loaded in the memory 504. A virtual machine 505 may be provided to handle a process running on multiple processors so that the process may appear to be using only one computing resource rather than multiple computing resources. Virtualization may be employed in the electronic device 500 so that infrastructure and resources in the electronic device may be shared dynamically. Multiple VMs 505 may be resident on a single computing device 500.

A hardware accelerator 506, may be implemented in an ASIC, FPGA, or some other device. The hardware accelerator 506 may be used to reduce the general processing time of the electronic device 500.

The electronic device 500 may include a network interface 508 to interface to a Local Area Network (LAN), Wide Area Network (WAN) or the Internet through a variety of connections including, but not limited to, standard telephone lines, LAN or WAN links (e.g., T1, T3, 56kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 508 may include a built-in network adapter, network interface card, personal computer memory card international association (PCMCIA) network card, card bus network adapter, wireless network adapter, universal serial bus (USB) network adapter, modem or any other device suitable for interfacing the electronic device 500 to any type of network capable of communication and performing the operations described herein.

The electronic device 500 may include one or more input devices 510, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 500 may include other suitable I/O peripherals.

The input devices 510 may allow a user to provide input that is registered on a visual display device 514. A graphical user interface (GUI) 516 may be shown on the display device 514.

A storage device 518 may also be associated with the computer 500. The storage device 518 may be accessible to the processor 502 via an I/O bus. The information may be executed, interpreted, manipulated, and/or otherwise processed by the processor 502. The storage device 518 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 518 may further store applications 522, and the electronic device 500 can be running an operating system (OS) 524. Examples of OS 524 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 518 may further store routing logic 526 for performing the techniques described above such as logic for building forwarding tables, calculating paths in the network, monitoring links in the network and the traffic on those links, and calculating a network topology, among other features.

In addition, the storage device 518 may store logic and/or files relating to the above-described path database 210, flow classifier 222, flow scheduler 224, flow database 226, flow table 240, meter table 250, and/or rate limiting engine 260.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A system comprising:
a storage storing information representative of a plurality of paths between nodes in a network; a processor configured to:
identify, from the information representative of the plurality of paths, a first route from a source to a destination in the network;
identify, from the information representative of the plurality of paths, a second route from the source to the destination;
classify a received packet into a network flow comprising a plurality of packets;
generate one or more rules for instructing a forwarding device to assign future received packets associated with the network flow to the second route;
transmit the one or more rules to the forwarding device;
determine that a particular amount of time has elapsed since transmitting the one or more rules to the forwarding device; and
transmit, responsive to determining that the amount of time has elapsed, a modification to the one or more rules,
wherein the modification is one of: (i) deleting the one or more rules or (ii) replacing at least one of the one or more rules with a new rule for instructing the forwarding device to assign future received packets associated with the network flow to the first route; and an interface for transmitting rules to the forwarding device.

2. The system of claim 1, wherein the forwarding device is a switch.

3. The system of claim 1, wherein the storage stores one or more flow tables for describing the paths in the network, and the processor further selects the first and second routes based on information from the flow tables.

4. The system of claim 1, wherein the processor generates rules for a plurality of forwarding devices.

5. The system of claim 1, wherein the processor assigns future received packets associated with a second network flow to the first route based on a determination that the second network flow is associated with a low delay requirement.

6. The system of claim 1, wherein the processor assigns future received packets associated with the network flow to the second route based on a determination that the network flow is not associated with a delay requirement.

7. The system of claim 1, wherein the received packet is classified into the network flow based on one or more of:
 a destination IP address of the received packet or a type-of-service header value of the received packet.

8. A method comprising:
 receiving a network packet associated with a source and a destination;
 classifying the network packet into a flow, the flow comprising a plurality of packets that are associated with each other based on a set of flow criteria;
 classifying the flow based on a latency tolerance of the flow;
 accessing a list of paths in the network between the source and the destination, the list of paths including at least a first path and a second path;
 assigning the flow to the second path based on the latency tolerance of the flow; and
 re-assigning the flow to another one of the paths in the list of paths, after an amount of time equal to a time limit has elapsed since assigning the flow to the second path.

9. The method of claim 8, wherein the flow comprises a plurality of packets sent from a common source to a common destination.

10. The method of claim 8, wherein the flow comprises a plurality of packets associated with a common service and a common source.

11. The method of claim 8, further comprising classifying the received network packet into the flow based on one or more of a destination IP address of the received network packet or a type-of-service header value of the received network packet.

12. The method of claim 8, wherein the flow is identified based on one or more parameters, the one or more parameters including at least one of a host prefix and a type of service associated with packets of the flow.

13. The system of claim 1, wherein the particular amount of time is one of: a predetermined time limit, a random time limit, or a time limit based on network conditions.

14. The method of claim 8, comprising:
 setting a timer for the time limit responsive to assigning the flow to the second path and determining that the amount of time has elapsed based on the timer, wherein the time limit is one of: a predetermined time limit, a random time limit, or a time limit based on network conditions.

15. The method of claim 8, wherein the flow is assigned to the second path further based on a specificity of a flow criterion satisfied by the flow.

16. The method of claim 15, wherein the flow criterion satisfied by the flow includes a destination address range, and wherein the specificity of the flow criterion is based on a size of the destination address range.

* * * * *